(12) United States Patent
Zhang et al.

(10) Patent No.: US 7,836,435 B2
(45) Date of Patent: Nov. 16, 2010

(54) CHECKING FOR MEMORY ACCESS COLLISIONS IN A MULTI-PROCESSOR ARCHITECTURE

(75) Inventors: Wenjie Zhang, Shanghai (CN); Xinan Tang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 1253 days.

(21) Appl. No.: 11/395,889

(22) Filed: Mar. 31, 2006

(65) Prior Publication Data

US 2007/0234310 A1    Oct. 4, 2007

(51) Int. Cl.
G06F 9/44    (2006.01)
(52) U.S. Cl. ..................................... 717/135
(58) Field of Classification Search ......... 717/136–154, 717/134–135; 711/124–144
See application file for complete search history.

(56) References Cited

U.S. PATENT DOCUMENTS

| | | | |
|---|---|---|---|
| 5,953,530 A * | 9/1999 | Rishi et al. ................. 717/127 |
| 6,000,007 A * | 12/1999 | Leung et al. ................ 711/105 |
| 6,009,269 A * | 12/1999 | Burrows et al. ............. 717/130 |
| 6,129,458 A * | 10/2000 | Waters et al. ............... 711/133 |
| 6,260,190 B1 * | 7/2001 | Ju ............................... 717/156 |
| 6,336,180 B1 * | 1/2002 | Long et al. .................... 712/34 |
| 6,463,523 B1 * | 10/2002 | Kessler et al. ............... 712/216 |
| 6,636,949 B2 * | 10/2003 | Barroso et al. .............. 711/141 |
| 6,658,578 B1 * | 12/2003 | Laurenti et al. ............. 713/324 |
| 6,718,485 B1 * | 4/2004 | Reiser .......................... 714/38 |
| 6,732,311 B1 * | 5/2004 | Fischer et al. ............... 714/737 |
| 6,738,796 B1 * | 5/2004 | Mobini ....................... 718/100 |
| 6,748,558 B1 * | 6/2004 | Gonzales et al. ............. 714/47 |
| 6,751,583 B1 * | 6/2004 | Clarke et al. ................. 703/17 |
| 6,883,067 B2 * | 4/2005 | Southwell et al. ........... 711/118 |
| 6,901,581 B1 * | 5/2005 | Schneider ................... 717/124 |
| 7,039,901 B2 * | 5/2006 | Hunter et al. ............... 717/124 |
| 7,069,413 B1 * | 6/2006 | Agesen et al. .............. 711/207 |
| 7,085,890 B2 * | 8/2006 | Kashyap ..................... 711/130 |
| 7,146,480 B2 * | 12/2006 | Schlansker et al. ......... 711/170 |
| 7,225,316 B2 * | 5/2007 | Thadani ...................... 711/202 |
| 7,409,602 B2 * | 8/2008 | Spadari ........................ 714/45 |
| 7,412,369 B1 * | 8/2008 | Gupta .......................... 703/14 |
| 7,415,594 B2 * | 8/2008 | Doerr et al. ................... 712/15 |
| 7,447,869 B2 * | 11/2008 | Kruger et al. ............... 711/205 |
| 7,478,027 B2 * | 1/2009 | Ban ............................ 703/13 |
| 7,683,905 B1 * | 3/2010 | Kirk et al. ................... 345/506 |
| 2002/0004876 A1 * | 1/2002 | Timmer et al. ................. 711/3 |
| 2002/0019969 A1 * | 2/2002 | Hellestrand et al. ........... 716/5 |
| 2002/0099912 A1 * | 7/2002 | Nakamura et al. .......... 711/119 |

(Continued)

OTHER PUBLICATIONS

"Detecting Data Races in Sequential Program with DIOTA" Michiel Ronsse, Ghent University, Belgium, 2004.*

(Continued)

*Primary Examiner*—Anna Deng
(74) *Attorney, Agent, or Firm*—Blakely, Sokoloff, Taylor & Zafman LLP (57) ABSTRACT

Checking for memory access collisions in a multiple processor architecture is described. Memory access collisions may be found by simulating an instruction to be executed by a multiple processor computing system in which the processors share memory access, extracting memory access information from the instruction, searching a virtual memory map for a memory access conflict, and reporting the conflict if a conflict is found in the search.

16 Claims, 5 Drawing Sheets

U.S. PATENT DOCUMENTS

| | | | |
|---|---|---|---|
| 2002/0116586 A1* | 8/2002 | Tremblay et al. | 711/143 |
| 2002/0166032 A1* | 11/2002 | Qadeer | 711/141 |
| 2003/0126590 A1* | 7/2003 | Burrows et al. | 717/154 |
| 2003/0154342 A1* | 8/2003 | Southwell et al. | 711/3 |
| 2003/0177332 A1* | 9/2003 | Shiota | 711/203 |
| 2003/0204819 A1* | 10/2003 | Matsumoto et al. | 716/1 |
| 2004/0064668 A1* | 4/2004 | Kjos et al. | 711/202 |
| 2005/0149916 A1* | 7/2005 | Shpeisman et al. | 717/140 |
| 2005/0154839 A1* | 7/2005 | DeWitt et al. | 711/144 |
| 2005/0155019 A1* | 7/2005 | Levine et al. | 717/127 |
| 2005/0155026 A1* | 7/2005 | DeWitt et al. | 717/158 |
| 2006/0200615 A1* | 9/2006 | Basso et al. | 711/3 |
| 2006/0212654 A1* | 9/2006 | Balakrishnan | 711/125 |
| 2008/0065842 A1* | 3/2008 | Dahlstedt et al. | 711/159 |

OTHER PUBLICATIONS

"Hybrid Dynamic Data Race Detection" Robert O'Callahan, IBM, Jun. 11-13, 2003.*

"Shared Memory Programming on NUMA-based Clusters using a general and open hybrid hardware/software approach" Martin Schulz, Apr. 2001.*

* cited by examiner

CHECKING FOR MEMORY ACCESS COLLISIONS IN A MULTI-PROCESSOR ARCHITECTURE

FIELD

The present description relates to checking software for memory access collisions that can occur in a multiple-processor environment, and in particular to a debugging tool using memory maps and a simulator.

BACKGROUND

Programming bugs caused by incorrectly using memory operations are very common in practice, especially on computer systems that use a parallel architecture. It may be very difficult to find the root causes of such memory errors. Common memory errors often fall into one of three different types: 1) reading un-initialized memory; 2) accessing memory over a boundary; and 3) memory leak.

In addition, parallel architectures can give rise to other types of memory errors, such as data racing. Data racing may occur, for example, when one processor uses a split-phased memory operation to issue a write command When the write command is issued, it takes the data a few cycles to reach the memory controller. In the meantime, the processor sends a signal to inform another processor that it can start to read the data. If there are separate read and write buses in the multi-processor system, and if the read command issued by the other processor arrives at the memory controller faster than the write command (going through different buses in a multi-processor system), then the read will receive the previous data rather than the just written data. Data racing may also cause errors when one processor writes memory data and two other processors read the memory data. If another processor re-writes the same memory with new data before the other two processors finish the read operation, then, the unfinished read processors will read out the wrong data.

BRIEF DESCRIPTION OF THE FIGURES

The invention may be more fully appreciated in connection with the following detailed description taken in conjunction with the accompanying drawings, in which like reference numerals refer to corresponding parts throughout the several views of the drawings, and in which.

DETAILED DESCRIPTION

The present description presents an innovative and efficient way to check for memory access collisions, which are the most common types of memory errors in single processor and parallel architecture systems. A stateful virtual memory map records the physical memory status, whether initialized or un-initialized. Each memory location has a set of states including a memory access counter and a time stamp. The virtual memory map is much smaller than the actual size of the physical memory because only the allocated memory is recorded in the map. This may accelerate the speed of a memory search.

Two hashing algorithms may be used to map physical memory to the virtual memory directly which also enhances the memory search speed. The physical memory's status may be checked from the virtual memory map before every memory operation, such as a read or write. By using a cycle-accurate simulator to keep track of the state changes of all of the memory operations, data racing conditions may be more accurately captured.

The resulting unified virtual memory map is efficient for shared memory management with multi-processor systems. All the memory may be mapped to one virtual map which makes it easy to find a memory collision during testing by setting flags for the same memory address to trace the current memory access status. The virtual memory map may be used to record the allocated memory rather than the whole memory map, so it is much more efficient for match address searching.

The benefits of runtime memory checking, compiler generated list file information and instruction level memory checking may be combined in the system described herein. Runtime memory checking provides accurate cycle information that may be used for checking if a memory operation has been finished. Compiler generated aid information may include debugging information, symbol tables, etc. This may catch not only memory errors that can't be caught by static memory checking or source code analysis, but also may catch memory errors caused by writes before reads, reads before writes, and multiple reads before re-writes in parallel programming. Instruction level memory checking with the accurate execution cycle information is very accurate because no memory operations will escape this memory checking level.

The described approach may be implemented as a memory checking tool for software development systems. It may help developers find memory errors in programming on a variety of parallel architecture systems. The approach may also be applied to the development of a multi-core processor memory collision checking tool. In addition, it may be used in a parallel programming model to solve resource accessing violations.

The described approach uses a close interaction between a compiler and a cycle-accurate simulator. In general, the compiler emits enough hints for the memory checker. Then the memory checker uses runtime information provided by the cycle-accurate simulator to capture any memory bugs. Unlike other approaches the cycle-accurate simulator provides more fine-grained hardware details that enable the memory checker to catch more memory related bugs. Time stamp-based accurate execution cycles and a memory reference counter that are generated by the compiler may be used to solve memory errors caused by a parallel processing environment.

Figure 1:
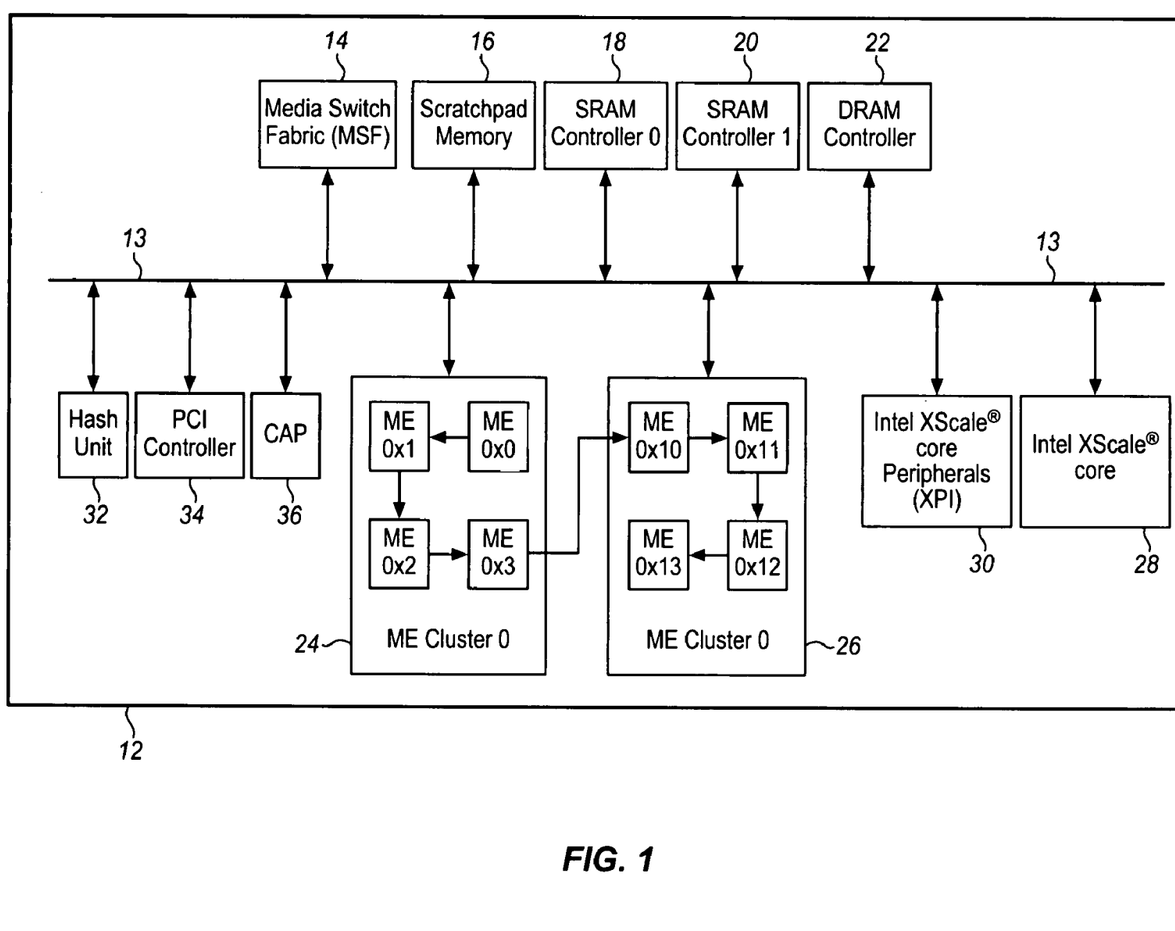
FIG. 1 is a block diagram of a system on a chip in accordance with an embodiment of the present invention.

The present description is based on an the Intel Internet Exchange Architecture (IXA). However, the same principles and operations may be applied to other systems and architectures. IXA may be described as an SOC (System on a Chip) packet-processing architecture focusing on programmable network processors. There may be at least two types of processor cores: XScale and MicroEngines(MEs). An XScale core normally runs control-plane code and multiple MEs run data-plane code. For example in the IXP2400 architecture, there are eight threads per ME and in total 64 thread-level parallelisms on the IXP2400. FIG. 1 shows a block diagram of an IXP2400 chip 12.

An internal data bus 13 connects resources to the cores. The peripherals include a MSF (Media Switch Fabric) 14, scratch-pad memory 16, two SRAM (Static Random Access Memory) controllers 0 and 1 18, 20, and a DRAM (Dynamic Random Access Memory) controller. The processing cores in this example are a first and second ME cluster 24, 26, and an XScale core 28. The illustrated ME clusters each have four sequenced cores. The bus is also coupled to an XScale Core peripherals interface (XPI) 30, a hash unit 32, a PCI controller 34 and CAP 36.

The XScale Core 28 and MEs 24, 26 access the same memory (Scratch/SRAM/DRAM) 16, 18, 20, 22. Memory errors can much more easily occur in this architecture because the same memory is managed by 2 different processors with no synchronization hardware between them. Furthermore, each cluster uses its own bus to access the shared memory system. As a result data racing conditions and other errors may easily occur. One embodiment of the present invention is a memory checking tool for the IXA platform. Other embodiments may provide a more generalized solution to multi-processor shared memory access collision avoidance. In one embodiment, a cycle-accurate simulator is used with a compiler to generate hints that allow memory accesses with reversed ordering to be captured. The error detection system may be implemented as a plug-in foreign model for the IXA tools.

Memory errors may be detected in four operations as detailed below. First a virtual memory map is set up for the XScale core. Second, a map of the relationship between allocated memories and variables is set up. Third a virtual memory map is set up for the ME clusters. Fourth, the tables are checked for memory access violations.

The error correction system described herein begins by setting up a virtual memory map in the XScale core. The virtual memory map may start with an empty set of fields. When XScale's initializations are fed with an initialization file (.ind file), the plug-in foreign model will parse each line in the initialization file. If a line is not a memory operation, the foreign model will pass the line to the simulator directly, otherwise the foreign model will process the line according to the type of memory operation (write or read), as detailed below.

For each memory write, one memory item will be added to the virtual memory map. If the item has not yet been entered in the map, then its status will also be initialized status. The item entered in the map will have the virtual memory's start address and the size of the memory. The virtual memory's start address may be hashed from the memory address in the initialization instruction. The memory's size may also be taken from the initialization instructions.

For each memory read, the memory address may be hashed to virtual memory first. Then, the virtual memory map may be searched with the hashed address. If the memory region is not recorded in the virtual memory map, an error message for a memory read violation may be generated.

Having set up the virtual memory map, the relationship between allocated memories and variables is mapped. The relationship between memory and variables may be set up by parsing list files. A linker will generate the list files and then the foreign model of the IXA tools may parse the linker generated list files. For example, the following two lines may represent list files:

. . .

% var aa 153 T dram1$tls+0 8
% var b 147 T sram0$tls+0 24

. . .

When these lines are parsed two new items may be added to the virtual map as shown in Table 1.

TABLE 1

| Virtual Memory Map after list file parsing | | | | | | |
|---|---|---|---|---|---|---|
| Memory Type | Symbol Name | Start Address | Memory Length | Memory Status | Memory Reference counter | Memory Issued Cycle# |
| ... | | ... | ... | ... | | |
| DRAM | aa | | 8 | 0 | | 8 |
| SRAM | bb | | 24 | 0 | | 8 |
| ... | ... | ... | ... | ... | | |

Note that a Memory Reference Counter may be extracted from a compiler-generated list file. The counter may be used to count how many other processors or threads will read the same memory data before the memory is re-written. A Memory Issued Cycle# may be filled with the accurate cycle number of write memory operation executions, which will help to check if the memory read is after the memory write finishing by calculating the interleaving between a write and a read operation.

With the relationships mapped into the table, the virtual memory map for the MEs may be set up. To do this, some code may be added into the loader of the compiler, which records the memory address assigned to every symbol and hashes the memory address to the virtual memory map. As for the virtual memory map, the memory status and start address may be updated accordingly. Note that the UOF file is a binary execution file on the IXA platform.

TABLE 2

| Virtual Memory Map after UOF file loading | | | | | | |
|---|---|---|---|---|---|---|
| Memory Type | Symbol Name | Start Address | Memory Length | Memory Status | Memory Reference counter | Memory Issued Cycle# |
| ... | ... | ... | ... | ... | | |
| DRAM | aa | 0x2000 | 8 | 1 | | 8 |
| SRAM | bb | 0x1000 | 24 | 1 | | 8 |
| ... | ... | ... | ... | ... | | |

If the symbol is an external or imported variable, the virtual memory map will be searched first. If no matching memory is found, then an item may be added into the map with an un-initialized Memory Status, otherwise the symbol may be ignored.

Figure 2:
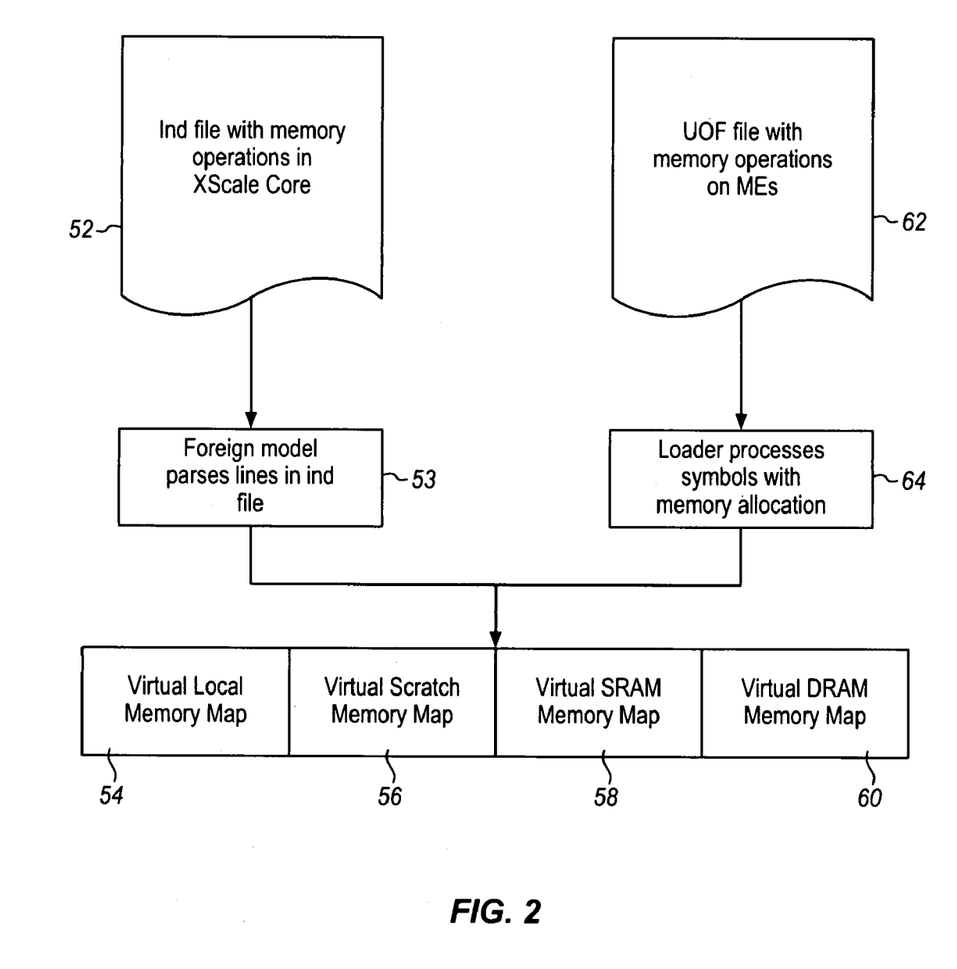
FIG. 2 is process flow diagram of setting up a virtual memory map in accordance with an embodiment of the invention.

FIG. 2 is a process flow diagram indicating the set up operations described above. Block 52 indicates an initialization file with memory operations that will be executed by the XScale core. The lines of the initialization file are fed to the foreign model. The foreign model parses the lines in the initialization file at block 53. If the line is a memory operation, then the memory address is hashed to the virtual address. The virtual memory map is searched and if the address is not yet in the map, then the memory address is added to the map. There are virtual memory maps created for local memory 54, scratch memory 56, SRAM memory 58, and DRAM memory 60. Block 62 indicates a UOF file containing memory operations to be executed by the MEs. The UOF files are fed to the loader. The loader allocates the symbols into the corresponding memory according to the list file information and loading time information.

Having initialized and configured the memory maps, memory access violations may be checked for. Memory accesses may be classified into two types, memory load (read), and memory store (write). After the UOF file (binary execution file on IXA) is loaded into the code store, the foreign model is also loaded and monitors the instructions' execution at the same time. Each instruction may be checked by the foreign model before the execution of each instruction. The foreign model will be launched by a transactor/simulator to check the instruction type using some disassembly. If the instruction is a memory operation, the foreign model will extract the memory operation type (read or write), memory type, memory address, and memory size from the instruction. Otherwise the instruction will be ignored by the foreign model.

Some instructions may require a more thorough analysis. For example, there are instructions to upload (send out) packets into or out of DRAM memory through the Media Switch Fabric (MSF) on the Intel IXA architecture. After this type of instruction is issued, the actual data packets will bypass the micro-engines and go between the MSF and DRAM directly. The data racing conditions caused by such memory operations cannot easily be detected since the data transaction is not visible to the micro-engines. With the aid of a cycle-accurate simulator, the DRAM bus may be monitored directly and such memory transactions may be recorded. This allows the state changes of the corresponding memory regions to be tracked.

The foreign model (a plug-in for the IXA developer tool kit) may be used to hash the extracted memory addresses to virtual memory addresses, and then use the memory type, memory address and memory size to search the virtual memory map to locate whether there is a matching item.

For memory load (read) operations, a memory read violation error or warning may be reported out if:

1) There is no matching item;
2) There is a matching item with an un-initialized (0=un-initialized, 1=initialized) memory status;
3) There is a matching item with an initialized memory status, but the read symbol name is not the corresponding symbol name (the corresponding symbol name may be obtained, for example, from debugging information);
4) There is a matching item with an initialized memory status, the read symbol name is the same as the corresponding symbol name, and the current cycle number minus "Memory Issued Cycle#" is less than the number of memory write finishing cycles, then the parallel programs' write before read error will be reported out.

If the current cycle number plus the "Memory Issued Cycle#" is greater than the number of memory write finishing cycles, then the "Memory Reference Counter" may be decremented by 1.

For memory store (write) operations, a memory write violation error or warning may be reported out if:

1) There is no matching item;
2) There is a matching item with an un-initialized memory status;
3) There is a matching item and the Memory Reference Counter of the matching item is greater than 0, suggesting that another processor or thread needs access to the same memory before the memory is re-written.

If the matching item's Memory Status is initialized, no error or warning needs to be reported out. However for error checking with parallel programming, a further check may be made. The matching item's Memory Status may be changed to an un-initialized status to prevent other threads from reading or writing to the same memory before the current memory cycle is finished. When a memory store finishing signal has issued, the Memory Status may be changed back to be initialized. This allows all the signals' statuses to be caught by the transactor/simulator. Another modification is to fill the "Memory Issued Cycle#" with the current execution cycle number. This modification may be used to avoid a memory error caused by another processor or thread performing a read operation before the current processor or thread's write operation is finished.

Figure 3:
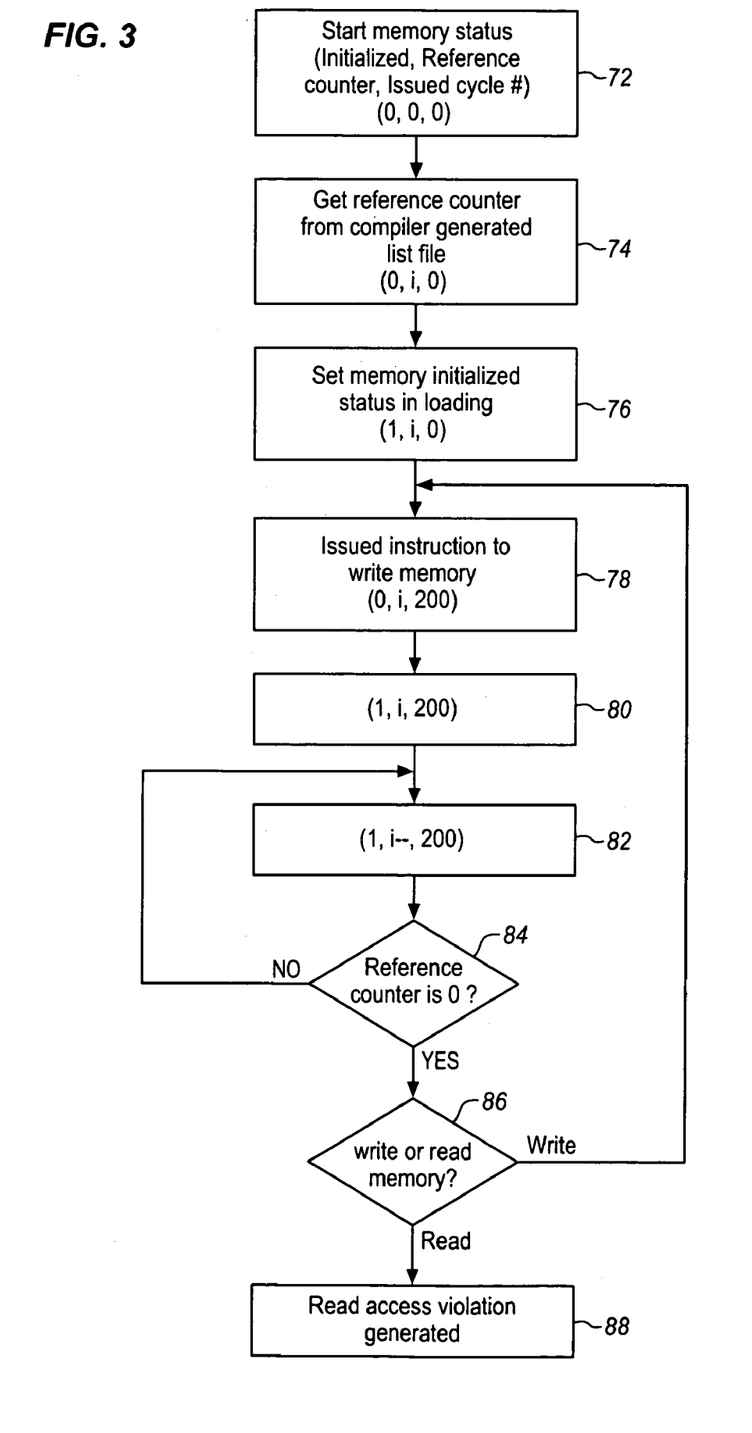
FIG. 3 is process flow diagram of changing a status of a memory in accordance with an embodiment of the invention.

FIG. 3 is a process flow diagram for changing the memory status. At block 72, the operations for memory status are started. The parameters are all set to 0 including the initialization value, the reference counter, and the number of issued cycles. The list file generated by the compiler is then parsed and at block 74, the reference counter value is obtained from the list file. The UOF file is loaded and at block 76, the memory status is set to initialized. At block 78, the simulator issues an instruction to write to the memory. This allows the current cycle number to be determined and in the example of FIG. 3, it is set to 200.

Blocks 80 and 82 show the status changes that occur during and after the write operation. First, the data write finished signal is obtained. The status may then be set to 1 and transition to block 80. Before that transition, if in the simulator, there is a read from another thread or processor before the write is finished, then an error will be generated and the current cycle # will by used to calculate if the memory is still readable. For a memory read instruction, the flow transitions to block 82. If at block 84, the reference counter is not 0, then the flow goes to block 82 for the next instruction. If the reference counter is zero, then the next instruction is reviewed to determine whether it is a read or a write at block 86. Read instructions indicate a conflict and a read access violation is generated. Write operations return back to block 78 for further analysis.

Figure 4:
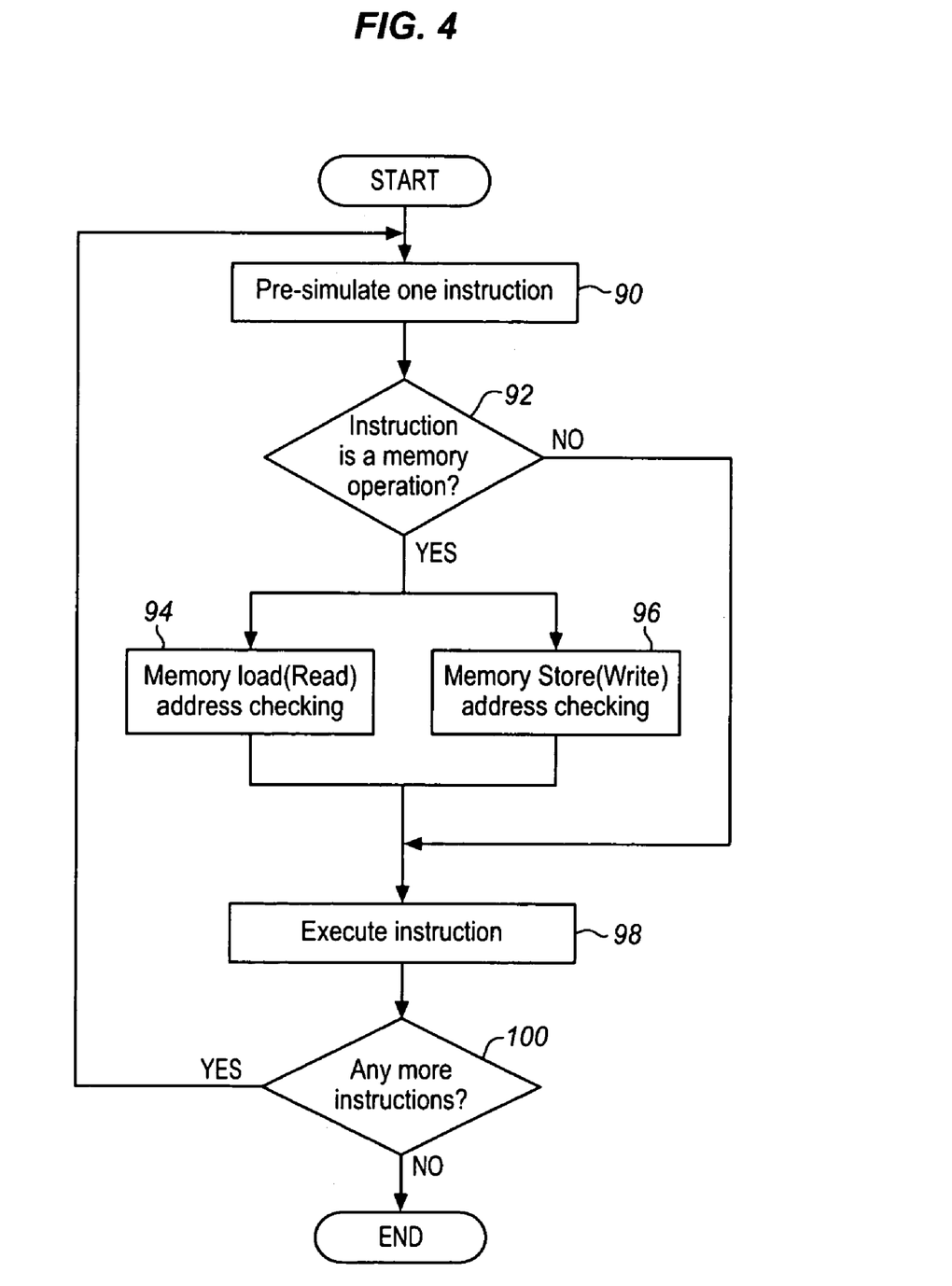
FIG. 4 is process flow diagram of checking for memory access violations in accordance with an embodiment of the invention.

FIG. 4 is a process flow diagram for checking memory access violations. At block 90, an instruction is pre-simulated. Memory checking at this point is based on the virtual memory maps and virtual memory addresses as described above. If the instruction is not a memory instruction at block 92, then it is executed directly at block 98. If the instruction is a memory operation, then an address check for a read operation is performed at block 94 or an address check for a write operation is performed at block 96. The instruction is then executed at block 98. If there are no more instructions at block 100, then the process ends. If additional instructions are found then the flow returns to block 90 to pre-simulate and analyze the additional instructions.

Figure 5:
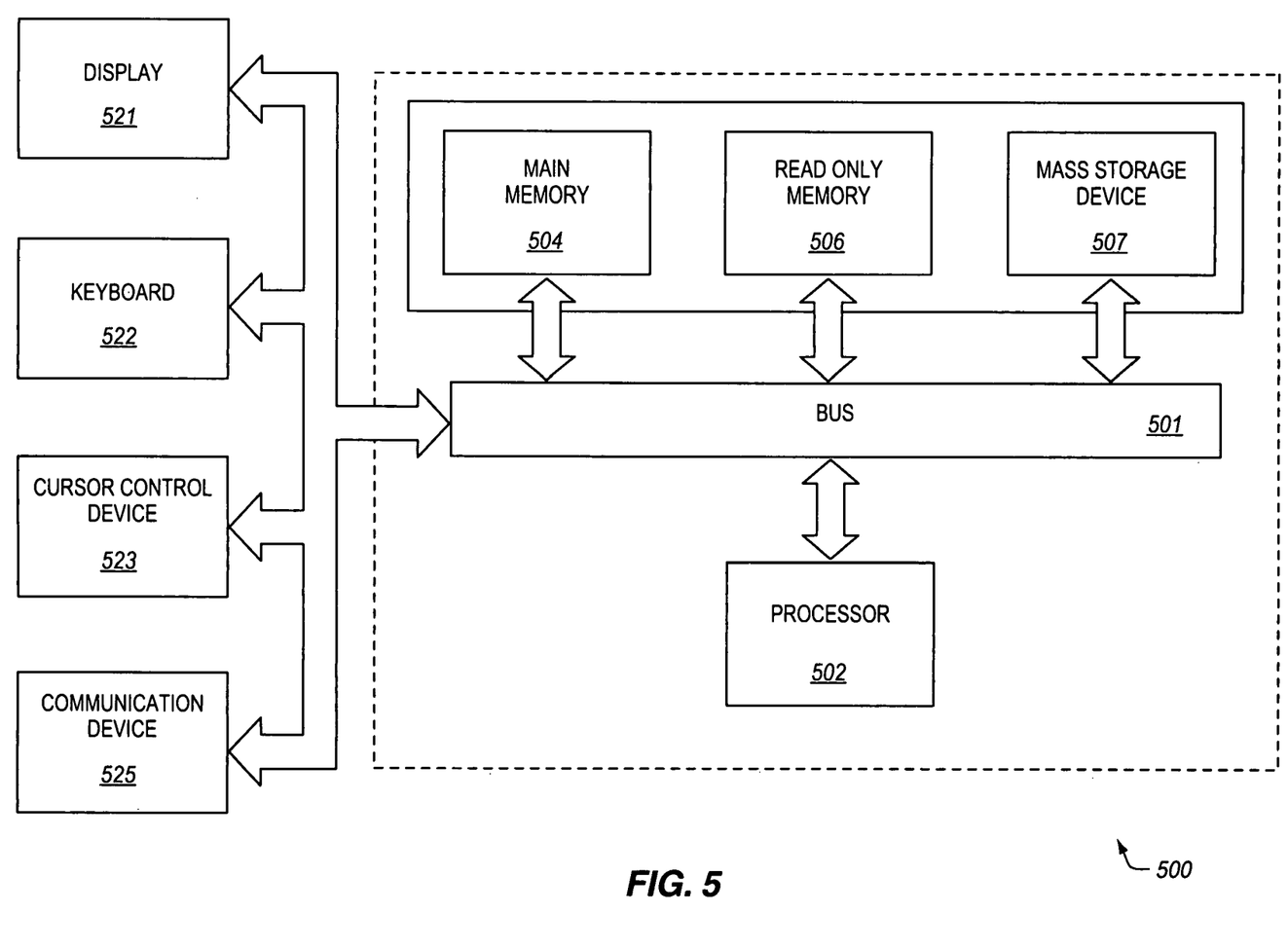
FIG. 5 is a block diagram of a computer system with multiple peripherals suitable for implementing embodiments of the present invention.

FIG. 5 shows a computer system 520 representing an example of a system upon which the process flow diagrams and registers mentioned above may be implemented and which may accommodate the SOC of FIG. 1. The computer system 520 includes a bus 521, for communicating information, and a processing means such as the SOC of FIG. 1 or a microprocessor with one or more processing cores 522 coupled with the bus 521 for processing information. The computer system 520 further includes a main memory 524, such as a random access memory (RAM) or other dynamic data storage device, coupled to the bus 521 for storing information and instructions to be executed by the processor 522. The main memory also may be used for storing temporary variables or other intermediate information during execution of instructions by the processor.

The computer system may also include a nonvolatile memory 526, such as a read only memory (ROM) or other static data storage device coupled to the bus for storing static information and instructions for the processor. A mass memory 527 such as a magnetic disk or optical disc and its corresponding drive may also be coupled to the bus of the computer system for storing information and instructions.

The computer system can also be coupled via the bus to a display device or monitor 531, such as a Liquid Crystal Display (LCD), for displaying information to a user. For example, graphical and textual indications of installation status, operations status and other information may be presented to the user on the display device. Typically, an alphanumeric input device 532, such as a keyboard with alphanumeric, function and other keys, may be coupled to the bus for communicating information and command selections to the processor. A cursor control input device 533, such as a mouse, a trackball, or cursor direction keys can be coupled to the bus for communicating direction information and command selections to the processor and to control cursor movement on the display 531.

A communication device 535 is also coupled to the bus 521. The communication device 535 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

It is to be appreciated that a lesser or more equipped computer system than the example described above may be preferred for certain implementations. Therefore, the configuration of the exemplary computer system 520 will vary from implementation to implementation depending upon numerous factors, such as price constraints, performance requirements, technological improvements, or other circumstances. Software that has been analyzed as described above may be operated on such a computer system. In addition, the validation systems and tools described above, may be implemented on such a computer system.

It is to be appreciated that a lesser or more equipped memory map, instruction files, loader, simulator, collision checking process, or computing environment than the examples described above may be preferred for certain implementations. Therefore, the configuration of the operations and system described above will vary from implementation to implementation depending upon numerous factors, such as price constraints, performance requirements, technological improvements, or other circumstances. Embodiments of the invention may also be applied to other types of software-driven systems that use different hardware architectures than that shown in the Figures.

While embodiments of the invention have been described in the context of a system on a chip with multiple processor cores sharing multiple memories, embodiments of the invention may also be applied to a wide range of other devices capable of memory access collisions.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
   fetching an instruction from a compiled software program;
   simulating an instruction to be executed by a multiple processor computing system in which the processors share memory access;
   extracting memory access information from the instruction by extracting a memory address and a memory size;
   determining a time stamp for the instruction in the form of a cycle number using the simulating;
   if the instruction is not a memory instruction, then allowing the instruction to execute;
   if the instruction is a memory instruction, then searching a virtual memory map for a memory access conflict by hashing the extracted memory address to an address in the virtual memory map to check the map for one of a read operation and a write operation having a conflicting cycle number from a different processor; and
   reporting the conflict if a conflict is found in the search and preventing the instruction from executing.

2. The method of claim 1, wherein extracting memory access information comprises extracting a memory operation type.

3. The method of claim 2, wherein reporting the conflict comprises reporting a conflict if the memory operation type is a read operation and in searching there is an item at the same address with a different symbol name.

4. The method of claim 2, wherein reporting the conflict comprises reporting a conflict if the memory operation type is a write operation and the matching item requires access to the same memory before the memory operation is finished writing.

5. The method of claim 1, wherein reporting a conflict comprises reporting a conflict if there is no matching item found in the search.

6. The method of claim 1, wherein reporting a conflict comprises reporting a conflict if a matching item with an un-initialized memory status is found in the search.

7. The method of claim 1, further comprising runtime memory checking to check if a memory operation has been finished.

8. The method of claim 1, further comprising generating a virtual memory map by parsing instructions in the compiled software program to determine a start address and a memory size for each instruction.

9. The method of claim 8, further comprising hashing the start address of to the virtual memory map.

10. The method of claim 9, further comprising mapping relationships in the virtual memory map between memory allocations and variables for each instruction.

11. An article comprising a non-transitory machine readable medium comprising data stored thereon that when operated on by the machine cause the machine to perform operations comprising:

fetching an instruction from a compiled software program;

simulating an instruction to be executed by a multiple processor computing system in which the processors share memory access;

extracting memory access information from the instruction by extracting a memory address and a memory size;

determining a time stamp for the instruction in the form of a cycle number using the simulating;

if the instruction is not a memory instruction, then allowing the instruction to execute;

if the instruction is a memory instruction, then searching a virtual memory map for a memory access conflict by hashing the extracted memory address to an address in the virtual memory map to check the map for one of a read operation and a write operation having a conflicting cycle number from a different processor; and reporting the conflict if a conflict is found in the search and preventing the instruction from executing.

12. The article of claim 11, wherein extracting memory access information comprises extracting a memory operation type.

13. An apparatus comprising:

a loader to fetch an instruction from a compiled software program;

a memory to store a virtual memory map;

a processor to simulate an instruction to be executed by a multiple processor computing system in which the processors share memory access, to extract memory access information from the instruction by extracting a memory address and a memory size, to determine a time stamp for the instruction in the form of a cycle number, if the instruction is not a memory instruction, then to allow the instruction to execute, if the instruction is a memory instruction, then to search a virtual memory map for a memory access conflict by hashing the extracted memory address to an address in the virtual memory map to check the map for one of a read operation and a write operation having a conflicting cycle number from a different processor, and to report the conflict if a conflict is found in the search and prevent the instruction from executing.

14. The apparatus of claim 13, wherein the virtual memory map includes a start address and a memory size for each fetched instruction.

15. The apparatus of claim 13, wherein reporting the conflict comprises reporting a conflict if the memory operation type is a write operation and the matching item requires access to the same memory before the memory operation is finished writing.

16. The apparatus of claim 13, wherein reporting a conflict comprises reporting a conflict if there is no matching item found in the search.

\* \* \* \* \*